Aug. 23, 1966 — W. MACK — 3,268,716
THERMOMETER CASE WITH AUTOMATIC ILLUMINATING AND MAGNIFYING MEANS
Filed May 5, 1964 — 2 Sheets-Sheet 1
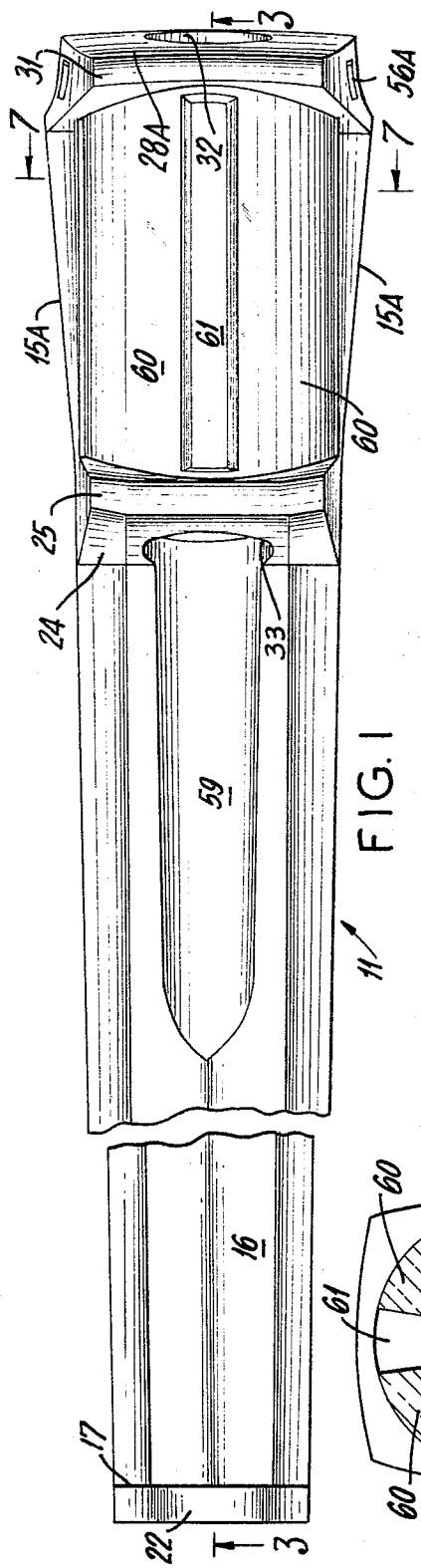
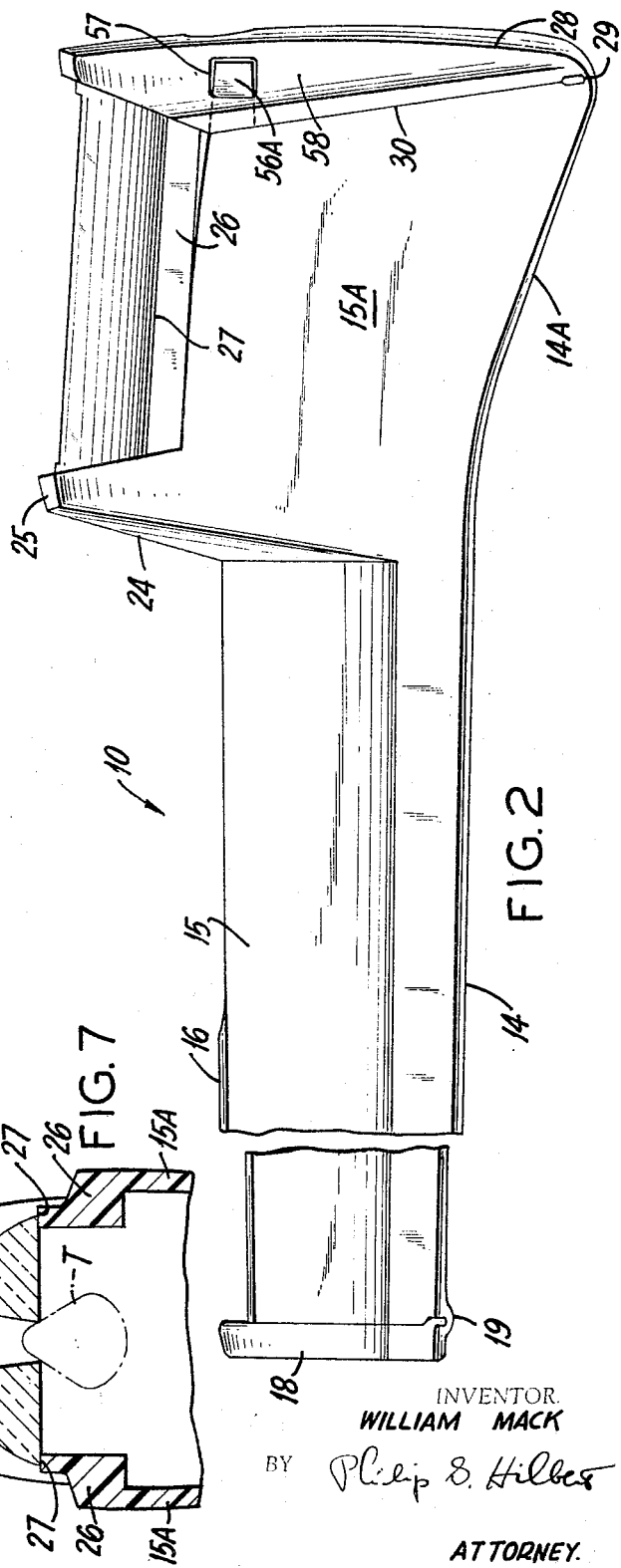
INVENTOR.
WILLIAM MACK
BY Philip S. Hilbert
ATTORNEY.

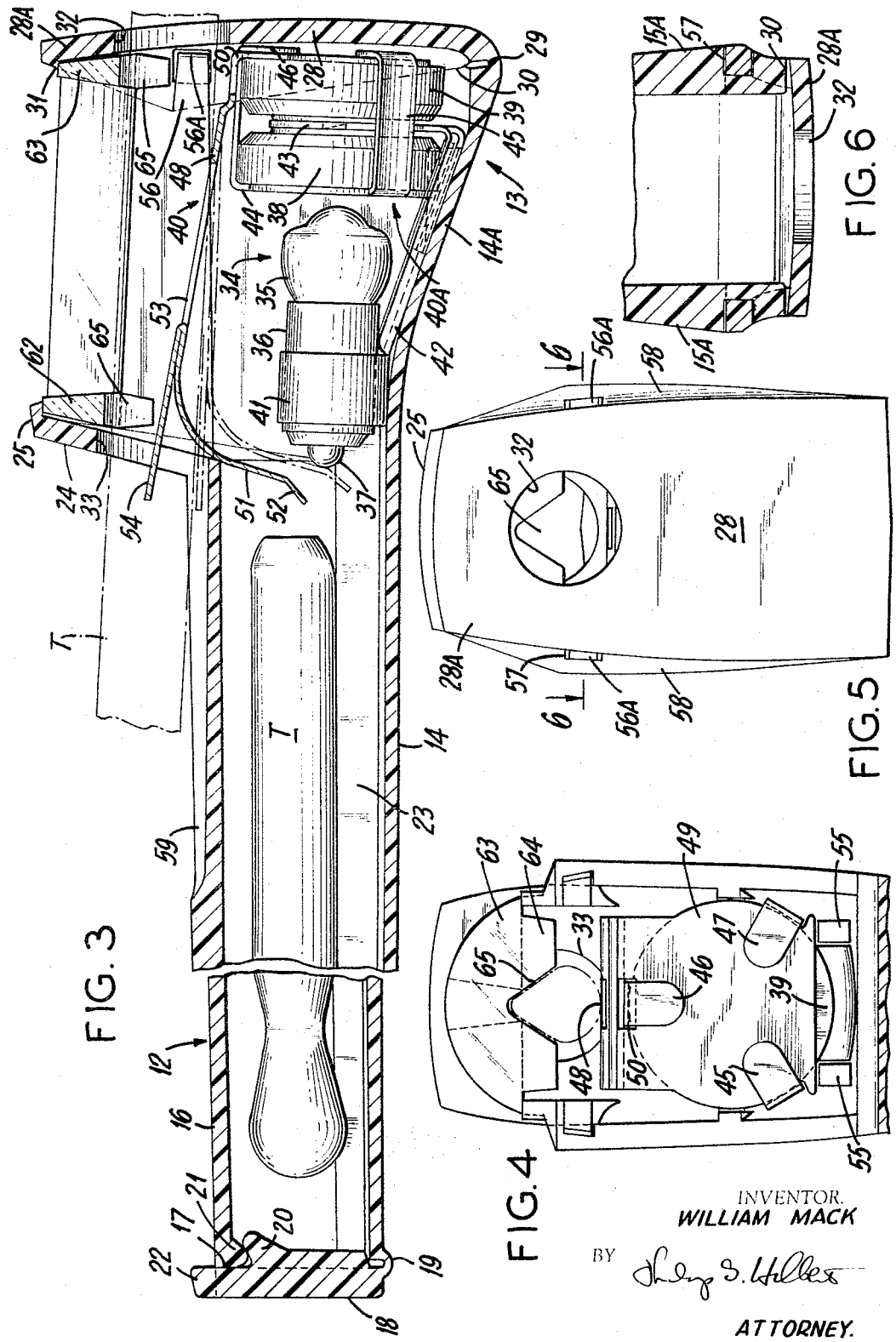

United States Patent Office 3,268,716
Patented August 23, 1966

3,268,716
THERMOMETER CASE WITH AUTOMATIC ILLUMINATING AND MAGNIFYING MEANS
William Mack, 222 Town Line Road, Commack, N.Y.
Filed May 5, 1964, Ser. No. 364,996
14 Claims. (Cl. 240—6.4)

This invention relates to a case for a clinical thermometer which includes means for automatically illuminating the thermometer for magnified viewing of the same.

An object of this invention is to provide improved means for automatically illuminating a clinical thermometer mounted on the means to greatly facilitate the reading thereof under poor ambient lighting conditions or for those having relatively poor vision.

A further object of this invention is to provide a device of the character described which is compact and of reduced bulk so as to facilitate carriage and storage thereof, as well as the actual use thereof when a reading of the thermometer must be taken.

Another object of this invention is to provide a thermometer illuminating means which is manipulated in an improved manner as the mounting of the thermometer in its viewing position is automatically effective to illuminate the same; the illuminating means being automatically deenergized upon removing the thermometer from its viewing position.

Still another object of this invention is to provide in a thermometer viewing device, improved magnifying means which includes integral means for self-focusing of the thermometer in its mounted position.

Yet another object of this invention is to provide in a device of the character described, improved viewing and magnifying means which is selectively operative with respect to the mercury column and the graduations and numerals of the thermometer as the same is being viewed under illuminating conditions.

Still another object of this invention is to provide an improved thermometer case which includes illuminating and magnifying viewing means, the case being formed as an integral, one piece plastic molding having improved structural features which facilitate the location of the illuminating and magnifying means therein.

Yet a further object of this invention is to provide in a device of the character described improved illuminating means comprising a novel combination of battery means, illuminating means and switch means, together with means for holding the same as a unitary assembly.

Still a further object of this invention is to provide in a device of the character described, an illuminating assembly including switch means which is automatically operated to energize the illuminating means upon mounting a thermometer on the device; the switch means being further adapted to be manually operated in the absence of a mounted thermometer to allow the device to be used solely as an illuminating device.

Other objects of this invention will in part be obvious and in part hereinafter pointed out.

In the drawings,
FIG. 1 is a top plan view of a thermometer viewing device embodying the invention;
FIG. 2 is a side elevational view thereof;
FIG. 3 is a longitudinal sectional view taken on the line 3—3 of FIG. 1;
FIG. 4 is an end elevational view thereof with the cover removed;
FIG. 5 is an end elevational view thereof with the cover in its closed position;
FIG. 6 is a sectional view taken on the line 6—6 of FIG. 5; and FIG. 7 is a sectional view taken on the line 7—7 of FIG. 1.

The device embodying the invention comprises essentially a molded plastic casing for housing a clinical thermometer when the same is not in use, together with a viewing portion at one end of the housing which encloses an assembly or module constituted of battery means, an electric bulb and switch means together with circuit means interconnecting the several elements in the form of a module.

In addition, the device includes an offset wall portion opposite the module which has an opening therein for mounting magnifying means which is adapted to have the clinical thermometer removably mounted therein in viewing position; the thermometer when in its viewing position being effective to automatically operate the switch means of the module to energize the electric bulb and thereby illuminate the thermometer.

Referring in detail to the drawings, 10 designates a thermometer viewing device embodying the invention. The same comprises a one piece molded plastic casing generally indicated at 11 and which is formed of polypropylene or other suitable synthetic resin. The casing 11 comprises an elongated tubular portion 12 of polygonal section for housing a clinical thermometer T when the same is not in use, and a short, enlarged hollow head portion 13 extending from one end of housing portion 12, for mounting thermometer T for illumination and viewing. Head portion 13 contains a combination of elements including an electric bulb, batteries, switch means and magnifying means, hereinafter described in detail.

The thermometer housing portion 12 comprises a back wall 14, side walls 15 and a front wall 16; the open end 17 of portion 12 being closed by a cover 18 which is integrally hinged to back wall 14, as at 19. When casing 11 is molded, cover 18 is disposed in a position 180° away from the open end 17 thereof. Thus, cover 18 when moved to its closing position is under tension at hinge 19 and the cover is retained in its closed position by an integral molded latch portion 20 extending angularly from the underside thereof for engagement with an integral molded detent 21 on front wall 16. Cover 18 is opened by snapping a lip portion 22 thereof away from housing end 17 to disengage latch portion 20 from detent 21; the resilient nature thereof allowing for engagement and disengagement thereof.

A soft pad 23 of foam material disposed within housing portion 12 cushions the thermometer T when the same is not in use and is kept in housing portion 12.

The hollow viewing head portion 13 comprises an outwardly flared back wall portion 14A extending from back wall 14 and side wall portions 15A extending from housing side walls 15. The head portion 13 further includes a laterally disposed, radially projecting wall portion 24 at the juncture of walls 15, 15A, said wall portion 24 including an upwardly directed lip 25 at the outer edge thereof. The side wall portions 15A include at their outer portions inwardly offset portions 26 having laterally opposed coplanar edges 27 which are disposed outwardly of housing front wall 16, for the purpose hereinafter appearing.

Head portion 13 further includes a cover 28 hinged integrally at 29 to back wall portion 14A, said cover 28 being displaced 180° away from the edge 30 of said head portion when in the casing 11, thereby placing cover 28 under tension when it is turned to its closing position. Cover 28 includes a forwardly extending portion 28A which is aligned with wall portion 24, and includes a downwardly directed lip 31. Cover 28 is formed with a centrally located thermometer receiving opening 32 on portion 28A thereof, said opening 32 being aligned with an opening 33 formed in wall portion 24, said opening 33 at its inner edge extending to front wall 16. Lip portions 25, 31 together with edges 27 define an opening in head portion 13 for viewing thermometer T as the same is disposed in aligned openings 32, 33 of cover 28 and wall portion 24, respectively.

The head portion 13 is adapted to removably receive therein a module or assembly of elements, generally indicated at 34. Module 34 comprises a miniature electric bulb 35 having a base 36 and contact 37; a pair of miniature, button type batteries 38, 39; normally open switch means generally indicated at 40; and retainer means generally indicated at 40A for holding bulb 35, batteries 38, 39 and switch means 40 together and in circuit with each other.

Bulb 35 has its base 36 mounted in a split tubular contact sleeve 41, with an arm 42 integral with sleeve 41 extending upwardly and along wall portion 14A and terminating in an inwardly and radially extending contact arm portion 43. Arm portion 43 is disposed between and in electrical contact with facing negative terminals of batteries 38, 39.

Retainer 40A of spring brass locks batteries 38, 39 together with interposed contact arm portion 43, thus holding bulb 35 in associated relation to said batteries. Retainer 40A comprises a flat annular portion 44 with a set of three lugs 45, 46 and 47 extending from the periphery thereof at an equiangular spacing therebetween. Battery 38 is seated on flat portion 44 of retainer 40A, thus making contact with the positive terminal thereof while the outer ends of lugs 45, 46 and 47 are bent over the outer surface of battery 39, thus connecting the positive terminals of batteries 38, 39 in parallel.

Switch means 40 comprises a flat metal spring portion 48 having a flat contact portion 49 at one end thereof and substantially at right angles thereto for facing contact with the positive terminal portion of battery 39. A slot 50 at the juncture of switch portions 48, 49 allows lug 46 to project therethrough for clinching engagement with contact portion 49, lugs 45, 46 making similar engagement with said contact portion.

Switch means 40 further includes an arcuate portion 51 extending from the other end of spring portion 48 and terminates in a contact portion 52. Spring portion 48 is normally angularly disposed relative to the axis of clamped batteries 38, 39 and with module 34 located in head portion 13, the top portion of said spring portion 48 is slightly below the level of edges 27 of wall portions 15A, while the bottom end thereof is in raised relation thereto, thus locating contact portion 52 in spaced relation to bulb contact 37, as shown in solid lines in FIG. 3.

Spring portion 48 is formed with an opening 53 located in opposed relation to bulb 35 and the metal displaced to form opening 53 is bent backwardly to form a switch arm portion 54 which projects outwardly through opening 33 in wall 24, FIG. 3, for the purpose hereinafter appearing.

Module 34 is properly located within head portion 13 by means of laterally spaced, integrally molded short rib portions 55 on the inner surface of back wall portion 14A, the arm 42 being disposed between said rib portions. The cover 28 is held in its closed position by integral lug portions 56 extending from side wall portions 15A adjacent edges 27 slightly beyond edge 30; said lug portions 56 including outwardly disposed shallow detent portions 56A receivable in openings 57 in the skirt portion 58 of cover 28. To open cover 28, wall portions 15A are pressed inwardly toward each other to release detent portions 56A from openings 57, thus allowing the tensioned cover 28 to move angularly to its open position, to permit insertion of removal of module 34 from head portion 13.

It will be apparent, that upon inserting thermometer T in aligned openings 32, 33 of cover 28 and wall 24, as shown in dot-dash lines in FIG. 3, spring portion 48 of switch means 40 will be depressed to the position shown in dot-dash lines, thereby allowing switch contact portion 52 to engage bulb contact 37 and thereby complete the circuit to parallel connected batteries 38, 39 to illuminate bulb 35 and thus allowing the thermometer portion disposed between cover 28 and wall 24 to be viewed. When thermometer T is removed from its viewing position, switch portion 48 automatically assumes its normal angular position shown in full lines, FIG. 3, to open the circuit to bulb 35. Front wall 16 is recessed longitudinally on its outer surface as at 59 to facilitate insertion and removal of thermometer T relative to openings 32, 33.

Means is provided for magnifying the graduations and numerals on thermometer T while viewing the same under illumination. To this end, such magnifying means comprises a pair of elongated, parallel magnifying elements 60 formed of Lucite or other suitable light transmitting and magnifying material. Elements 60 are of sector cross section, each having an angular extent of the order of 80–82° and disposed relative to each other on a common base line with an elongated space 61 therebetween.

The elements 60 are interconnected at their opposite ends by web portions 62, 63 having portions 64 depending below the base line of elements 60. Web portions 64 are formed with centrally located, inverted V-shaped grooves 65, the apex of said grooves being aligned with space 61 between elements 60. Since clinical thermometers are generally of V section, the same are readily accommodated in grooves 65 of webs 64, thus properly locating the medially disposed mercury column of the thermometer opposite the space 61 between elements 60 to allow direct illumination thereof by bulb 35 through opening 53 in switch spring portion 48.

The opposite edges of elements 60 at the base line thereof are seated on wall edges 27, see FIG. 7, while the webs 62, 63 are received in lip portions 25, 31 respectively, thus retaining the magnifying means in proper position when cover 28 is in its closed position.

The grooves 65 in web portions 64 of the magnifying means allows for self alignment of the inserted thermometer T, irrespective of slight variations in sectional area of such thermometers. Also, spring member 48 is in resilient contact with the back portion of the inserted thermometer T to properly locate the same relative to the magnifying elements 60 which are effective to present an erect, magnified composite view of the graduations and numerals on said inserted thermometer, yet permits the thermometer to be readily moved into and out of the openings 32, 33. The opening 53 in spring portion 48 has a width about equal to that of the usual opaque or translucent stripe present on the back surface of clinical thermometers, and the light transmitted from bulb 35 is diffused to produce a softly lighted background which silhouettes the mercury column for high visibility.

Such diffused light from bulb 35 also illuminates the magnified graduations and numerals directly to assure maximum utilization of the illumination power of miniature bulb 35.

Switch arm 54 projecting through opening 33 allows device 10 to be used as a miniature illuminating means, when thermometer T is not in its viewing position. In such case, arm 54 may be depressed manually, to close the circuit to bulb 35 and to illuminate the same. The resultant illumination passing through opening 53 in spring portion 48 and between magnifying elements 60, is available for any desired purpose.

It will be apparent that on opening cover 28 by pressing side wall portions 15A together, the module 34 may be removed, as when batteries 38, 39 are exhausted; and a replacement module may be reinserted. Also, the magnifying means 60 may be similarly removed and replaced if desired. Thus, the casing 10, with module 34 and magnifying means 60 removed, may be sterilized by immersion in alcohol, boiling water or in an autoclave.

The module 34, as well as magnifying means 60 may be suitably mounted in various housings which may omit storage means for the thermometer, or may have enlarged storage means to accommodate various accessories as well as the thermometer.

It has been found that illuminating the mercury column portion of thermometer T directly and without magnification, while illuminating the graduations and numerals with magnification, increases the efficiency in taking quick and accurate readings under poor lighting conditions or by those with impaired vision.

As various changes might be made in the embodiment of the invention herein disclosed without departing from the spirit thereof, it is understood that all matter herein shown or described shall be deemed illustrative and not by way of limitation except as set forth in the appended claims.

What is claimed is:

1. A clinical thermometer illuminating device comprising an elongated casing, an illuminating assembly within one end of said casing, said assembly comprising an electric bulb, battery means and circuit closing means in circuit with said bulb and battery means, said casing having at said one end thereof a radially projecting walled portion, a pair of longitudinally aligned openings in said radially projecting walled portion, said aligned openings extending substantially radially of the longitudinal axis of said casing for slidably mounting therein a clinical thermometer in opposed relation to said electric bulb, said radially projecting casing portion having an opening therein extending substantially parallel to the longitudinal axis of said casing for viewing said mounted thermometer, said circuit closing means including a movable spring member in a normally open circuit position and located for engagement by the clinical thermometer in the mounted position thereof to move said spring member to its circuit closing position whereby said bulb is energized by said batteries to illuminate said mounted thermometer.

2. A device as in claim 1 wherein said spring member includes a manually engageable portion for manually moving said spring member to its circuit closing position in the absence of said clinical thermometer to energize said bulb and to direct the illumination thereof through the opening in said head portion.

3. A device as in claim 1 and further including magnifying means mounted in the opening in said head portion, said magnifying means including means for slidably mounting said clinical thermometer in registering relation with the opening in said head portion.

4. A clinical thermometer illuminating device comprising a hollow casing portion having a viewing opening in a wall portion thereof, an illuminating assembly within said casing portion, said assembly comprising an electric bulb, battery means and circuit closing means in circuit with said bulb and battery means, said bulb being located in opposed relation to said opening in the casing portion, said casing portion including a pair of spaced walled portions projecting radially outward relative to the longitudinal axis of said casing portion, said projecting wall portions having aligned openings therein for slidably receiving a clinical thermometer therein and locating said thermometer in opposed relation to the opening in the wall of said casing portion, said circuit closing means including a movable arm portion located for engagement by said thermometer as it is slidably mounted in said projecting walled portions of the casing portion to move said arm portion to its circuit closing position and to thereby energize said electric bulb, whereby said thermometer is illuminated.

5. A device as in claim 4 wherein said movable arm portion is located between said electric bulb and the thermometer in its mounted position, said movable arm portion being formed with an aperture to pass the illumination of said electric bulb to said thermometer.

6. A device as in claim 5 wherein said assembly comprises sleeve means for mounting said bulb therein, an arm extending from said sleeve means for electrical contact with said battery means, retainer means for locking said last mentioned arm to said battery means, said movable arm portion having a terminal contact portion in electrical contact with said battery means.

7. A thermometer viewing device comprising a hollow casing, an opening in a wall portion of said casing, means for mounting magnifying means over said opening and in outwardly offset relation to the wall portion of said casing, illuminating means within said casing comprising electric bulb means, battery means and switch means in circuit with said bulb means and said battery means, said switch means including a movable arm disposed between said magnifying means and said bulb means, said magnifying means including means for slidably mounting a thermometer in a position over said wall opening, said switch arm being engaged by said thermometer in its mounted position and moved to a circuit closing position to illuminate said bulb means, said switch arm being formed with an opening to allow the illumination of said bulb means to focus on the mounted thermometer.

8. A thermometer viewing device as in claim 7 wherein said magnifying means comprises a pair of elongated magnifying elements and web means at the opposite ends of said elements for holding said elements in parallel, spaced relation to provide an elongated space therebetween in alignment with the opening in said switch arm, said web means being formed with openings in longitudinal alignment for passing said thermometer therethrough.

9. A thermometer viewing device as in claim 8 wherein the openings in said web means are of a shape correlated to the section of said thermometer to provide self alignment of the thermometer in its mounted position relative to said magnifying elements, said switch arm resiliently engaging said thermometer to maintain said thermometer in its aligned position.

10. A thermometer viewing device as in claim 9 wherein said magnifying elements are of sector cross-section arranged to have a common base line, each element having an angular section of about 80° to provide a space therebetween having an angular extent of about 20°, the mercury column of the mounted thermometer being aligned with said space to allow for a direct view thereof.

11. A thermometer viewing device as in claim 8 wherein said switch arm includes an arm portion projecting through the opening in one of said web means for manual operation to close the switch means in the absence of a thermometer in its mounted position on said magnifying means, to illuminate said bulb means.

12. A thermometer viewing device comprising a molded plastic casing of tubular form, said casing including a thermometer storing portion and an enlarged head portion extending from said thermometer storing portion, cover means integrally hinged at each of the opposite ends of said casing, said cover means normally tensioned to the open position thereof, means for retaining each of said cover means in the closed position thereof, said enlarged head portion including a radially extending wall portion extending outwardly thereof at the juncture of said thermometer storing and head portions, said cover means for the head portion including a radially projecting portion in longitudinal alignment with said radially extending wall portion, said enlarged head portion including side wall portions having forwardly disposed, coplanar edges located at the base of said radially extending wall portion, illuminating means within said enlarged head portion, said illuminating means comprising an electric bulb, battery means and switch means in circuit with said bulb and battery means, said switch means including a movable switch arm, magnifying means mounted on the coplanar edges of said enlarged head portion and projecting outwardly thereof, said magnifying means being retained at the opposite ends thereof by said radially extending wall portion and the radially projecting portion of said last mentioned cover means, said radially extending wall portion and the radially projecting portion of said last mentioned cover means being formed with aligned openings for slidably passing a thermometer therethrough to locate said thermometer in opposed relation to said magnifying means and said bulb, said switch arm being engaged by said thermometer and moved to a circuit closing position to energize said bulb and to thus illuminate said thermometer.

13. A thermometer viewing device as in claim 12 wherein said switch arm is disposed between said bulb and said magnifying means, said switch arm being formed with an elongated opening to allow light from said bulb to pass therethrough to directly illuminate said thermometer.

14. A thermometer viewing device as in claim 12 wherein said magnifying means comprises a pair of elongated magnifying elements of sector cross section, means for holding said magnifying elements in spaced, parallel relation comprising web means interconnecting said magnifying elements at the opposite ends thereof, said web means including portions formed with openings respectively registering with the openings in the radially projecting wall portion and the radially projecting portion of said last mentioned cover means.

References Cited by the Examiner
UNITED STATES PATENTS

| | | | |
|---|---|---|---|
| 2,554,854 | 5/1951 | Chomes | 240—6.4 |
| 2,787,937 | 4/1957 | Prisament | 240—6.4 X |
| 2,797,308 | 6/1957 | Best et al. | 240—6.4 |
| 3,002,426 | 10/1961 | McCabe | 88—26 |

LOUIS R. PRINCE, *Primary Examiner.*

D. M. YASICH, *Assistant Examiner.*